US012715237B1

(12) United States Patent
Kariotis

(10) Patent No.: US 12,715,237 B1
(45) Date of Patent: Aug. 25, 2026

(54) PORTABLE AND REFILLABLE PAINT SYSTEM

(71) Applicant: George Kariotis, Sacramento, CA (US)

(72) Inventor: George Kariotis, Sacramento, CA (US)

( * ) Notice: Subject to any disclaimer, the term of this patent is extended or adjusted under 35 U.S.C. 154(b) by 0 days.

(21) Appl. No.: 18/821,110

(22) Filed: Aug. 30, 2024

Related U.S. Application Data

(60) Provisional application No. 63/647,202, filed on May 14, 2024.

(51) Int. Cl.
*B44D 3/12* (2006.01)

(52) U.S. Cl.
CPC .................................... *B44D 3/126* (2013.01)

(58) Field of Classification Search
CPC ..... B44D 3/126; B05C 17/002; B05C 17/003; B05C 17/0245; B05C 17/03
See application file for complete search history.

(56) References Cited

U.S. PATENT DOCUMENTS

| | | | | |
|---|---|---|---|---|
| 3,020,579 | A | 2/1962 | O'Conner | |
| 5,248,089 | A | 9/1993 | Bekius | |
| 7,621,686 | B2 | 11/2009 | Fernschild et al. | |
| 9,475,084 | B2 | 10/2016 | Frenkel et al. | |
| 9,486,063 | B2 | 11/2016 | Roman | |
| 10,864,538 | B2 | 12/2020 | Allis et al. | |
| 11,919,682 | B1 * | 3/2024 | Stem | B44D 3/126 |
| 2002/0112309 | A1 * | 8/2002 | Rougeau | B44D 3/122 15/257.06 |
| 2009/0266295 | A1 * | 10/2009 | Saunders | B05B 9/0838 118/300 |
| 2016/0375460 | A1 | 12/2016 | Matsko | |
| 2019/0322124 | A1 * | 10/2019 | Keane | A45F 5/00 |
| 2021/0308715 | A1 | 10/2021 | Martin | |

FOREIGN PATENT DOCUMENTS

| | | |
|---|---|---|
| CN | 216380461 U | 4/2022 |

* cited by examiner

*Primary Examiner* — Jason K Niesz
(74) *Attorney, Agent, or Firm* — John Rizvi; John Rizvi, P.A.—The Patent Professor®

(57) ABSTRACT

A portable and refillable system comprising a paint device and a paint bucket is described. The paint device comprises a ramp wall having a plurality of teeth staggered thereon, a space defined by the ramp wall, a back wall, and side walls for accommodating paint therein, and a paint hose configured to enable flow of the paint into the space of the paint device. The paint bucket comprises a container portion configured to store paint therein, the container portion comprising a funnel-shaped bottom wall, an air inlet pipe configured to allow flow of air into the container portion, and an outlet pipe fluidly coupled to the container portion via an opening in the funnel-shaped bottom wall, the outlet pipe being configured to allow flow of the paint from the container portion to the paint device via the paint hose, thereby fluidly coupling the paint bucket to the paint device.

19 Claims, 7 Drawing Sheets

PORTABLE AND REFILLABLE PAINT SYSTEM

CROSS-REFERENCE TO RELATED APPLICATIONS

This application claims the benefit of U.S. Provisional Patent Application Ser. No. 63/647,202 filed on May 14, 2024, which is incorporated by reference herein in its entirety.

FIELD OF THE INVENTION

The present invention relates generally to paint systems, and more particularly to a portable and refillable system that can be carried by a painter for use with paint rollers in paint applications.

BACKGROUND OF THE INVENTION

Paint rollers are essential tools used in various painting applications to efficiently apply paint to surfaces, ranging from walls and ceilings to furniture and other objects. Paint rollers offer significant advantages over traditional paint-brushes, including faster coverage and smoother finishes.

One common issue faced by painters is that paint buckets have to be taken to places where paint application is required. Generally, painters carry the paint buckets by hand and place the paint bucket adjacent to the place where paint application is required. However, such a practice is inconvenient for painters particularly in tight areas and confined spaces. Such tight areas may not have proper resting place for paint buckets. Moreover, it is inconvenient for painters to move in and out of such tight areas whenever paint roller has to be dipped in paint, or whenever refilling of paint is needed.

Another challenge faced by painters is ensuring that paint rollers effectively absorb and retain paint throughout the painting process. Inadequate paint absorption can result in frequent reloading of the roller, leading to interruptions in workflow and inefficiencies during paint application. Moreover, poor paint retention may cause the paint to drip or splatter during use, resulting in messy and uneven finishes.

Accordingly, there is an established need for a solution to the problems mentioned above. For instance, there is an established need for a system that enables a painter to conveniently carry paint bucket and paint devices for paint application in tight areas, and further, refill the paint devices on the spot as and when required.

SUMMARY OF THE INVENTION

The present invention relates to a system comprising a paint device and a paint bucket is described. The paint device comprises a ramp wall having a plurality of teeth arranged in a staggered manner, and a space defined by the ramp wall, a back wall, and side walls for accommodating paint therein. The paint device further comprises a paint hose configured to allow flow of paint into the space. The paint bucket comprises a container portion for storing paint, an air inlet pipe for allowing air to enter into the container portion, and an outlet pipe coupled to the paint hose. The outlet pipe is configured to allow flow of paint from the container portion to the space of the paint device via the paint hose.

In an aspect, the plurality of teeth are configured to cause an increase in surface area of a roller cover of the paint roller when the paint roller rolls over the plurality of teeth.

In an aspect, the back wall of the paint device comprises a bracket configured to allow the paint device to be coupled to a waist belt.

In an aspect, the waist belt may be provided along with the paint device and the paint bucket.

In an aspect, the back wall of the paint device comprises a strap configured to allow the paint device to be secured round a thigh of the painter.

In an aspect, the paint hose is attached to the side wall of the paint device via a knob, the knob being configured to control the flow of paint into the space of the paint device.

In an aspect, the paint bucket includes a cap portion threadably engaged with the container portion, wherein the air inlet pipe is configured to allow flow of air into the container portion when the cap portion is engaged with the container portion.

In an aspect, the container portion comprises a funnel-shaped bottom wall fluidly coupled to the outlet pipe.

In an aspect, the outlet pipe is coupled to the paint hose by means of a pipe hole in the container portion of the paint bucket.

In an aspect, the paint bucket is configured to be accommodated within a bag, wherein the bag comprises shoulder straps configured to allow the bag to be worn by the painter.

The present invention relates to a paint device configured to be coupled to a portable paint bucket. The paint device comprises a back wall and a ramp wall comprising a plurality of teeth staggered thereon. The plurality of teeth are configured to cause an increase in surface area of a roller cover of a paint roller when the paint roller rolls over the plurality of teeth. The paint device further comprises side walls interconnecting the back wall and the ramp wall, and a space defined by the ramp wall, the back wall, and the side walls for accommodating paint therein. The paint device further comprises a paint hose coupled to one of the side walls, the paint hose being configured to enable flow of the paint from the paint bucket into the space of the paint device.

In an aspect, the paint device may further comprise a bracket coupled to the back wall and defining an area therebetween, the bracket configured to receive a belt into the defined area, thereby enabling the paint device to be worn by a painter.

In an aspect, the paint device may further comprise a strap coupled to the back wall, the strap being configured to be wrapped around a limb of a painter, thereby enabling the paint device to be secured to the painter.

In an aspect, the paint hose may comprise a knob configured to control the flow of paint into the space of the paint device, wherein the knob may be rotatable to control the flow of paint into the space of the paint device.

In an aspect, the paint hose may be coupled to an outlet pipe of the paint bucket, thereby fluidly coupling the paint device to the paint bucket.

In an aspect, the ramp wall may be angled with respect to back wall.

The present invention further relates to a paint bucket configured to be fluid coupled to a paint device. The paint bucket comprises a cap portion and a container portion configured to be threadably engaged with the cap portion. The container portion comprises a funnel-shaped bottom wall, wherein the container portion is configured to store paint therein. The paint bucket further comprises an outlet pipe fluidly coupled to the container portion via an opening in the funnel-shaped bottom wall, the outlet pipe being configured to allow flow of the paint from the container portion to the paint device, thereby fluidly coupling the paint bucket to the paint device. The paint bucket is portable.

In an aspect, the paint bucket may further comprise a pipe hole in the container portion, the pipe hole being configured to fluidly couple the outlet pipe to a paint hose of the paint device, wherein the outlet pipe may extend between the pipe hole and the funnel-shaped bottom wall.

In an aspect, the cap portion may comprise an air inlet pipe configured to allow flow of air into the container portion when the cap portion is engaged with the container portion.

In an aspect, the air inlet pipe may comprise a check valve configured to allow the flow of air into the container portion and prevent the flow of paint therethrough.

In an aspect, the paint bucket may be configured to be accommodated within a bag, wherein the bag may comprise shoulder straps configured to allow the bag to be carried by a painter.

The present invention further relates to a portable and refillable paint system. The system comprises a paint device and a paint bucket fluidly coupled to the paint device. The paint device comprises a ramp wall having a plurality of teeth staggered thereon. The paint device further comprises a space defined by the ramp wall, a back wall, and side walls for accommodating paint therein. The paint device further comprises a paint hose configured to enable flow of the paint into the space of the paint device. The paint bucket comprises a container portion configured to store paint therein, the container portion comprising a funnel-shaped bottom wall. The paint bucket further comprises an air inlet pipe configured to allow flow of air into the container portion. The paint bucket further comprises an outlet pipe fluidly coupled to the container portion via an opening in the funnel-shaped bottom wall, the outlet pipe being configured to allow flow of the paint from the container portion to the paint device via the paint hose, thereby fluidly coupling the paint bucket to the paint device.

In an aspect, the paint bucket may further comprise a pipe hole in the container portion, the pipe hole being configured to fluidly couple the outlet pipe with the paint hose of the paint device, wherein the outlet pipe may extend between the pipe hole and the funnel-shaped bottom wall.

In an aspect, the paint bucket may further comprise a cap portion integrated with the air inlet pipe, the air inlet pipe comprising a check valve configured to allow the flow of air into the container portion and prevent the flow of paint therethrough.

In an aspect, the paint bucket may be configured to be accommodated within a bag, wherein the bag may comprise shoulder straps configured to allow the bag to be carried by a painter.

In an aspect, the paint device may further comprise a bracket coupled to the back wall and defining an area therebetween, the bracket configured to receive a belt into the defined area, thereby enabling the paint device to be worn by a painter.

In an aspect, the paint device may further comprise a strap coupled to the back wall, the strap being configured to be wrapped around a limb of a painter, thereby enabling the paint device to be secured to the painter.

In an aspect, the paint hose may comprise a knob configured to control the flow of paint from the container portion of the paint bucket into the space of the paint device, wherein the knob may be rotatable to control the flow of paint into the space of the paint device.

In an aspect, the paint hose may be transparent, thereby enabling a painter to monitor the flow of paint in the paint hose.

In an aspect, each teeth of the plurality of teeth may be funnel shaped, and wherein the plurality of teeth may be configured to cause an increase in surface area of a roller cover of a paint roller when the paint roller rolls over the plurality of teeth.

These and other objects, features, and advantages of the present invention will become more readily apparent from the attached drawings and the detailed description of the embodiments and examples, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1A:
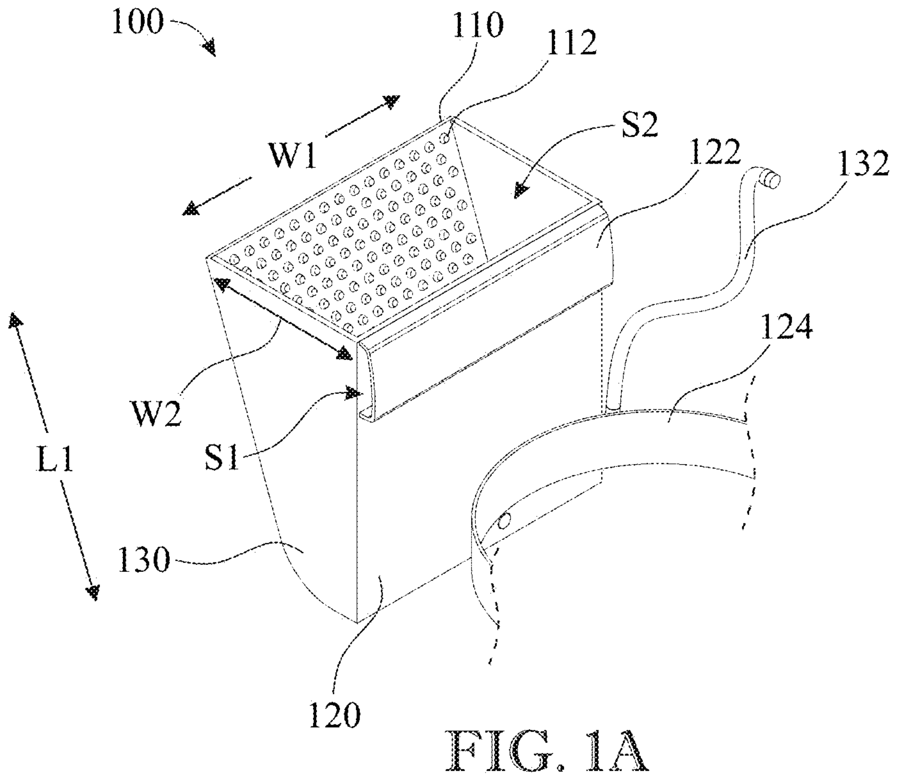
FIGS. 1A and 1B illustrate isometric views of a paint device, in accordance with one embodiment of the present specification.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other embodiments. All of the embodiments described below are exemplary embodiments provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the drawings. Furthermore, there is no intention to be bound by any expressed or implied theory presented in the preceding technical field, background, brief summary or the following detailed description.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known elements associated with paint buckets and paint rollers have not been shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is, as “including, but not limited to.”

As used in this specification and the appended claims, the singular forms “a,” “an,” and “the” include plural referents unless the content clearly dictates otherwise, and the vice versa. It should also be noted that the term “or” is generally employed in its broadest sense, that is, as meaning “and/or” unless the content clearly dictates otherwise.

The headings and Abstract of the Disclosure provided herein are for convenience only and do not interpret the scope or meaning of the embodiments.

Figure 1B:
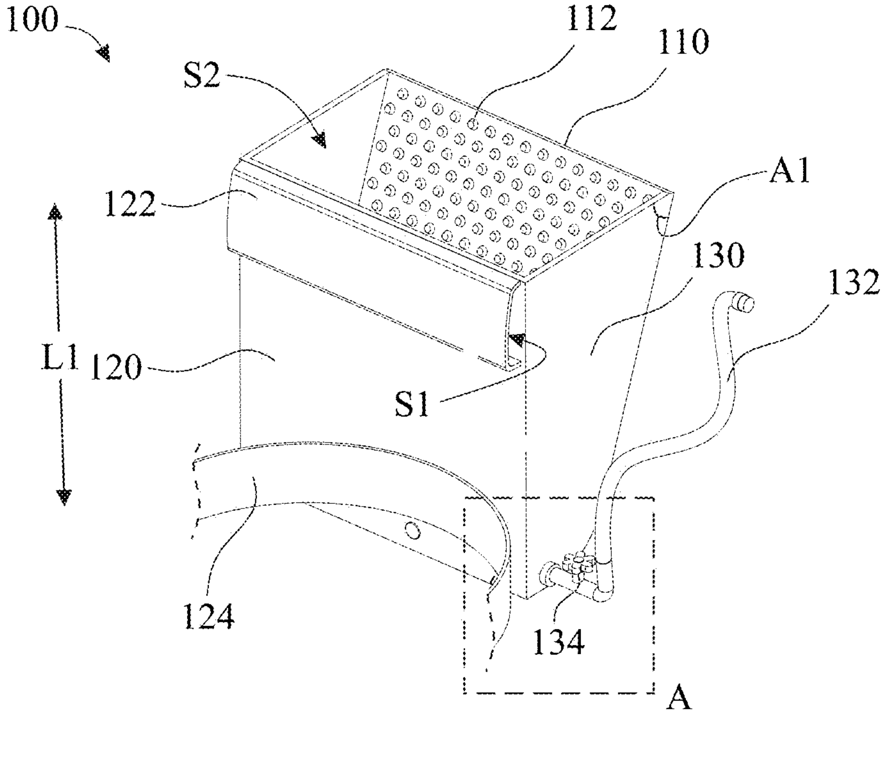

FIGS. 1A and 1B illustrate isometric views of a paint device 100, in accordance with an embodiment of the present invention. The paint device 100 is configured to be coupled to a portable paint bucket. The paint device 100 along with the portable paint bucket forms a refillable system where a painter may refill the paint device 100 via the portable paint bucket.

The paint device 100 (hereinafter referred to as ‘the device 100’) may comprise a ramp wall 110, a back wall 120, and side walls 130. The ramp wall 110 may be fixedly attached to the back wall 120 and the side walls 130. In an embodiment, joints of the ramp wall 110 with the back wall 120 may be a smooth curved surface. In an embodiment, the ramp wall 110, the back wall 120, and the side walls 130 may be integrally formed with each other. In another embodiment, the ramp wall 110, the back wall 120, and the side walls 130 may be separately formed and fixedly connected to each other.

In an embodiment, the ramp wall 110 may be angled with respect to the back wall 120. In an embodiment, the ramp wall 110 may form an angle µl of around 70 degrees. In a non-limiting example, the ramp wall 110 may have an angle of around 95 degrees with the back wall 120. In an embodiment, the width W1 of the ramp wall 110 may be around 11 inches. In an embodiment, a width W2 of the side walls 130 may be around 7 inches. In an embodiment, a width of the device 100 at the bottom of the device 100 may be around 3 inches. In an embodiment, a length L1 of the ramp wall 110 may be around 8 inches and a length L2 of the back wall 120 may be around 7 inches.

The ramp wall 110 may include a plurality of teeth 112. The plurality of teeth 112 may be arranged on the ramp wall 110. In an embodiment, the plurality of teeth 112 may be arranged linearly on the ramp wall 110. In an embodiment, the plurality of teeth 112 may be staggered in various patterns on the ramp wall 110. It is appreciated that the number of the plurality of teeth 112 on the ramp wall 110 may be pre-decided to enable optimal absorption of the paint by a paint roller. By virtue of being staggered, the plurality of teeth 112 create dimples and/or poke holes at different positions on the paint roller when the paint roller rolls over the device 100, thereby increasing paint absorption by the paint roller. The term ‘dimples’ used herein may refer to recessions or spaces in the paint rollers that allow paint to fill or be collected into the recessions/spaces, thereby enabling paint absorption.

In an embodiment, the plurality of teeth 112 may be arranged over a majority of the ramp wall 110. It is appreciated that the number of the plurality of teeth 112 on the ramp wall 110 may be pre-decided.

In an embodiment, each of the plurality of teeth 112 may be funnel shaped. For instance, each of the plurality of teeth 112 may have a side wall that tapers to a top end thereof. In an embodiment, each of the plurality of teeth 112 may have a height of around ⅜ inches. In an embodiment, each of the plurality of teeth 112 may have a base width of around ¼ inches and a top width of around ⅛ inches.

Further, the back wall 120 may include a bracket 122 and a strap 124. The strap 124 may be configured to allow the device 100 to be secured to a thigh of the painter. In an embodiment, the strap 124 may comprise a Velcro portion configured to facilitate the strap 124 to be securely work around a thigh of the painter.

The bracket 122 may be configured to enable the device 100 to be secured on to a painter. In an embodiment, the bracket 122 may be fixedly coupled to the back wall 120. The bracket 122 may define a space S1 (or an area) between the bracket 122 and the back wall 120. In particular, a waist belt may be received through the space S1 of the bracket 122. The waist belt may be provided along with the device 100 and is worn by the painter. The bracket 122 may allow a waist belt to be received there-through. As the waist belt is held securely in the space between the bracket 122 and the back wall 120, a painter may wear the device 100 with the waist belt passing through the space S1 of the bracket 122 such that the device 100 is securely held to the painter.

The device 100 may further include a paint hose 132 provided at the side wall 130 of the device 100. The paint hose 132 may enable paint to be delivered to a space S2 defined by the ramp wall 110, the back wall 120, and the side walls 130. The paint hose 132 may be attached to the side wall 130 via a knob 134. The knob 134 may be configured to control the flow of paint into the space S2. In an embodiment, the knob 134 may be a fitting that facilitates easy maintenance and replacement when required.

Figure 2:
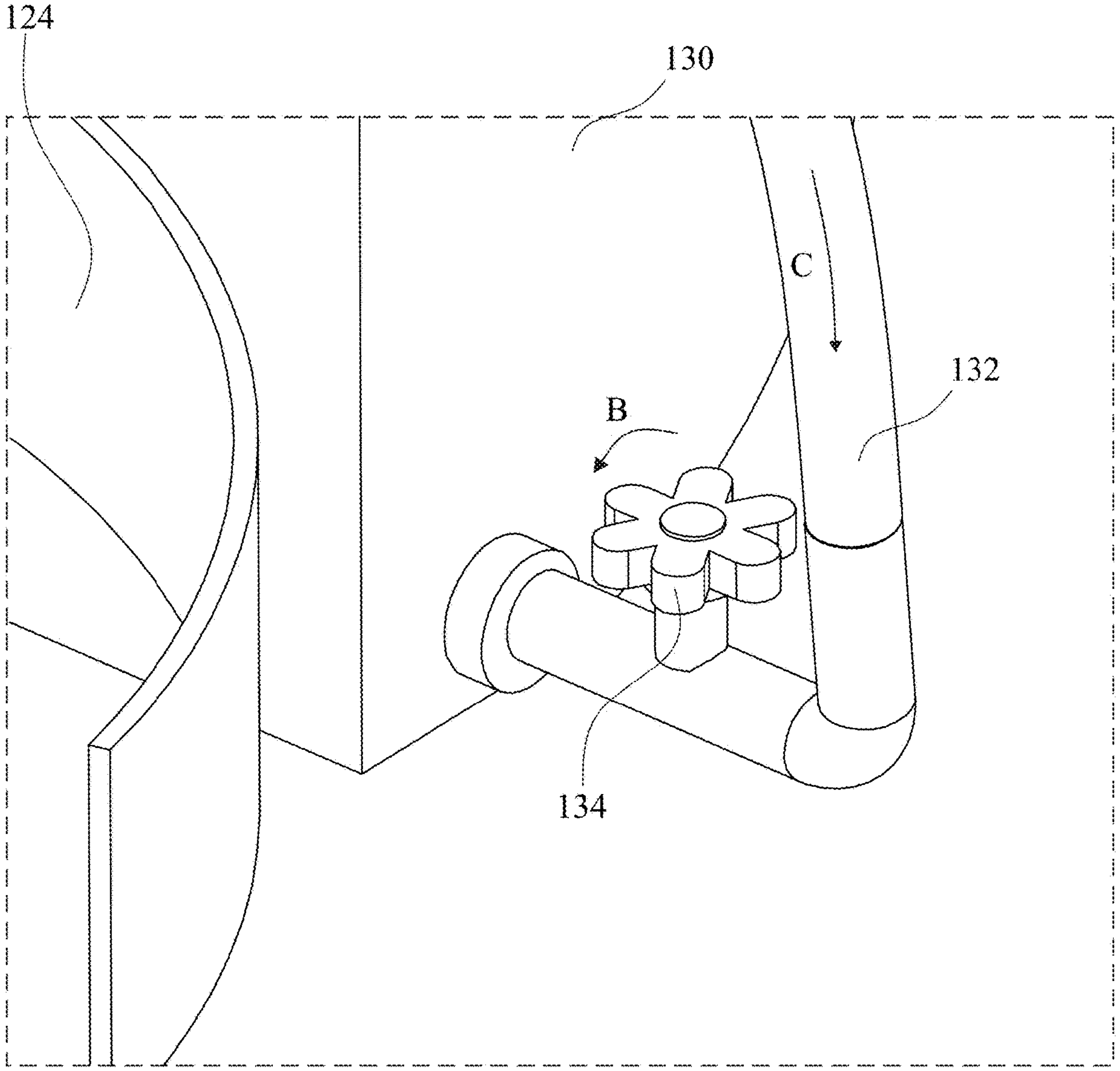
FIG. 2 illustrates a close-up view of area A of FIG. 1B, in accordance with one embodiment of the present specification.

FIG. 2 illustrates a close-up view of area A of FIG. 1B. FIG. 2 depicts the straps 124, the knob 134, and the paint hose 132. In an embodiment, the knob 134 may be rotated manually in order to control the flow of paint into the space S2. For instance, the knob 134 may be rotated in the direction B to allow flow of paint into the space S2 of the device 100 as depicted by arrow C. In an embodiment, the paint hose 132 is a clear, transparent hose that allows a painter to view and/or monitor the paint within the paint hose 132. When the knob 134 is open, paint may flow into the space S2 of the device 100. When required, the painter may manually rotate the knob 134 to cease the flow of paint into the space S2. In an embodiment, the paint hose 132 may be connected at one end thereof to the side wall 130 and at the other end, the paint hose 132 may be connected to the paint bucket.

Figure 3A:
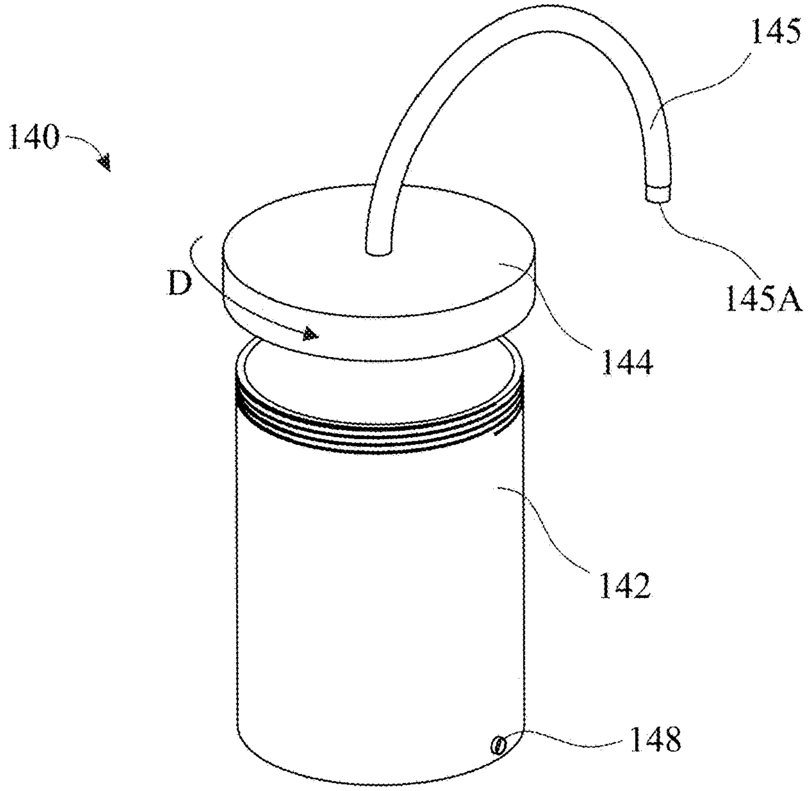
FIGS. 3A and 3B illustrate isometric views of a paint bucket, in accordance with one embodiment of the present specification
Figure 3B:
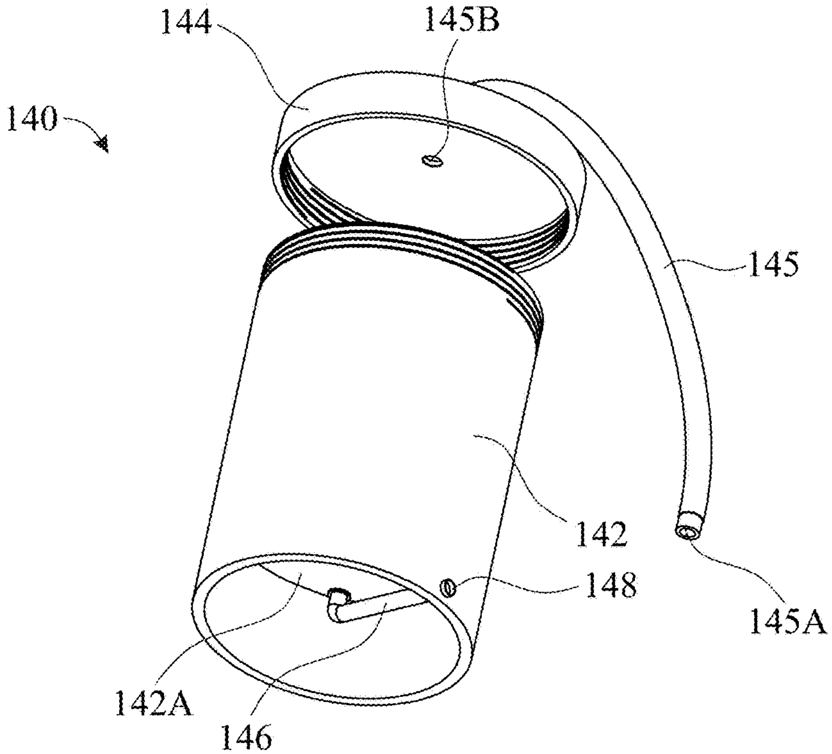

FIGS. 3A and 3B illustrate various isometric views of a paint bucket 140. The paint bucket 140 may be configured to be carried by a painter while on a paint application job. The paint bucket 140 may include a container portion 142 and a cap portion 144. The cap portion 144 may be threadably engaged with the container portion 142. The container portion 142 may be configured to store paint therein. In an embodiment, the container portion 142 may allow around two gallons of paint to be stored therein. The cap portion 144 may be removal engaged with the container portion 142. The cap portion 144 may be rotated in the direction shown by arrow D in order to threadably engage with the container portion 142.

The cap portion 144 may be configured to allow flow of air into the container portion 142 when paint is made to flow from the paint bucket 140 to the device 100. The cap portion 144 may include an air inlet pipe 145 configured to allow flow of air into the container portion 142, when the cap portion 144 is engaged with the container portion 142. The air inlet pipe 145 may include a first, free end 145*a* which allows air to enter into the air inlet pipe 145. The air inlet pipe 145 may further include a second end 145*b* coupled to the cap portion 144. When the cap portion 144 is engaged with the container portion 142, the second end 145*b* may open into the container portion 142, thereby allowing flow of air into the container portion 142. In an embodiment, the air inlet pipe 145 may include a check valve that allows air to enter the air inlet pipe 145, however, prevents flow of paint through the air inlet pipe 145.

The container portion 142 may be configured to store paint therein. The container portion 142 includes an outlet pipe 146 at a bottom wall 142*a*. The outlet pipe 146 may be configured to allow flow of paint from the container portion 142 to the device 100. In an embodiment, the bottom wall 142*a* may be configured to allow natural flow of paint into the outlet pipe 146. In an embodiment, the bottom wall 142*a* may be funnel-shaped to allow flow of paint from the container portion 142 to the outlet pipe 146. In an embodiment, the outlet pipe 146 may be in the form of a removable fitting facilitating a painter to remove the outlet pipe 146 for maintenance, cleaning, and/or replacing purposes.

Figure 4A:
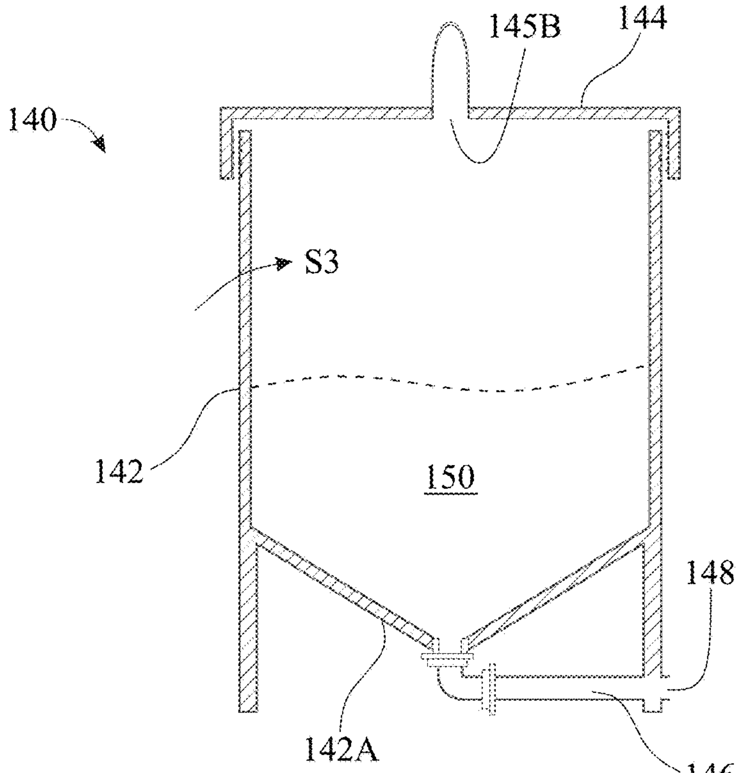
FIG. 4A illustrates a cross-sectional view of the paint bucket, in accordance with one embodiment of the present specification.

FIG. 4A illustrates a cross-sectional view of the paint bucket 140. The cap portion 144 is threadably engaged with the container portion 142. The container portion 142 defines a space S3 configured to store paint 150. The container portion 142 includes the funnel-shaped bottom wall 142*a*. The bottom wall 142*a* includes an opening connected to the outlet pipe 146. The paint 150 may thus flow into the outlet pipe 146 via the opening in the bottom wall 142*a*. The container portion 142 may further include a pipe hole 148 that opens into the outlet pipe 146. The outlet pipe 146 thus extends between the pipe hole 148 and the bottom wall 142*a*. The pipe hole 148 may be configured to facilitate connection of the outlet pipe 146 to the device 100 via the paint hose 132.

Figure 4B:
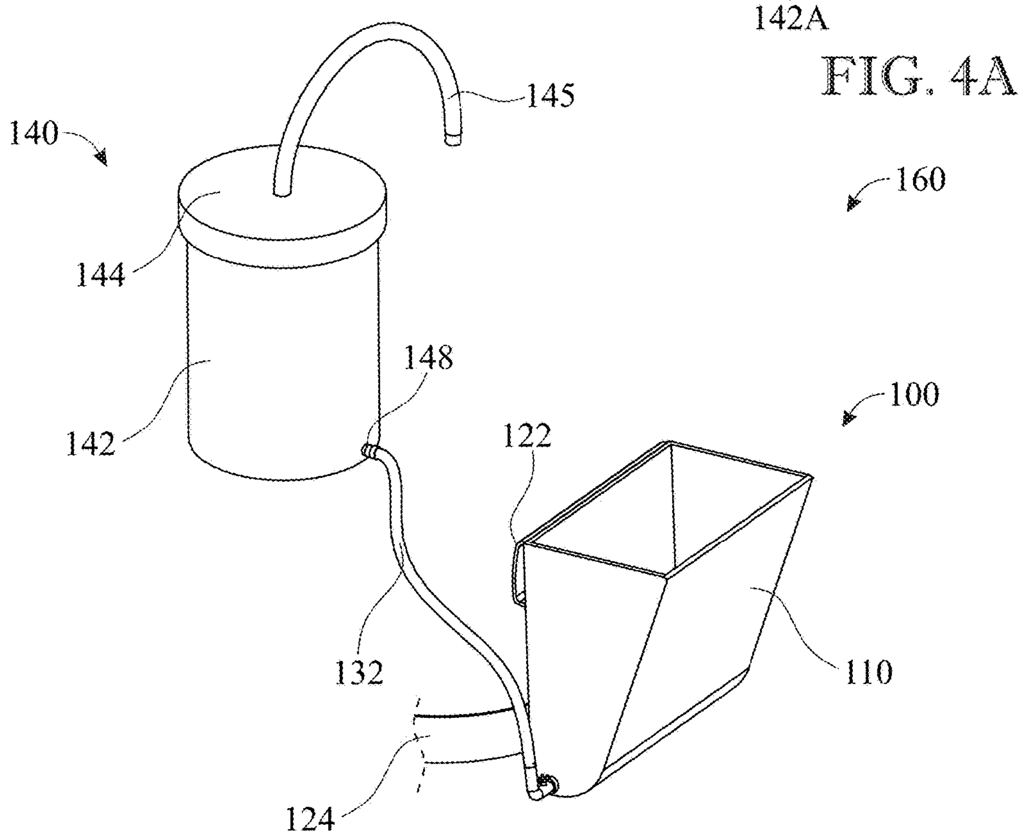
FIG. 4B illustrates an isometric view of a refillable system comprising the paint device and the paint bucket, in accordance with one embodiment of the present specification.

FIG. 4B illustrates an isometric view of a refillable system 160 comprising the device 100 and the paint bucket 140. The refillable system 160 may be carried by a painter and used in paint applications. The refillable system 160 allows the painter to go into tight spaces for paint application, with all the necessary things required for the paint application.

The system 160 includes the device 100 coupled to the paint bucket 140. The paint bucket 140 has paint stored in the container portion 142. The paint hose 132 fluidly connects the device 100 with the paint bucket 140. In particular, the paint hose 132 is connected at one end thereof to the side wall 130 of the device 100 and at other end thereof to the container portion 142 via the pipe hole 148. When the knob 134 is activated (open), the paint may flow from the container portion 142 into the space S2 of the device 100 via the paint hose 132.

Further, the flow of paint out of the container portion 142 via the bottom wall 142*a* may be facilitated by the air inlet pipe 145. The air enters the container portion 142 via the second end 145*b* of the air inlet pipe 145. The air entering into the container portion 142 displaces and takes the volume of paint that flows out of the container portion 142 via the bottom wall 142*a*.

Accordingly, flow of paint out of the container portion 142 and into the device 100 is facilitated by the air inlet pipe 145.

That is, the air may first enter the container portion 142 via the air inlet pipe 145. The paint stored in the container portion 142 then flows into the outlet pipe 146 via the opening in the funnel-shaped bottom wall 142*a* of the container portion 142. The paint then flows out of the outlet pipe 146 into the paint hose 132 via the pipe hole 148. The paint flows through the paint hose 132 and enters the space S2 of the device 100 when the knob 134 is open.

Figure 5A:
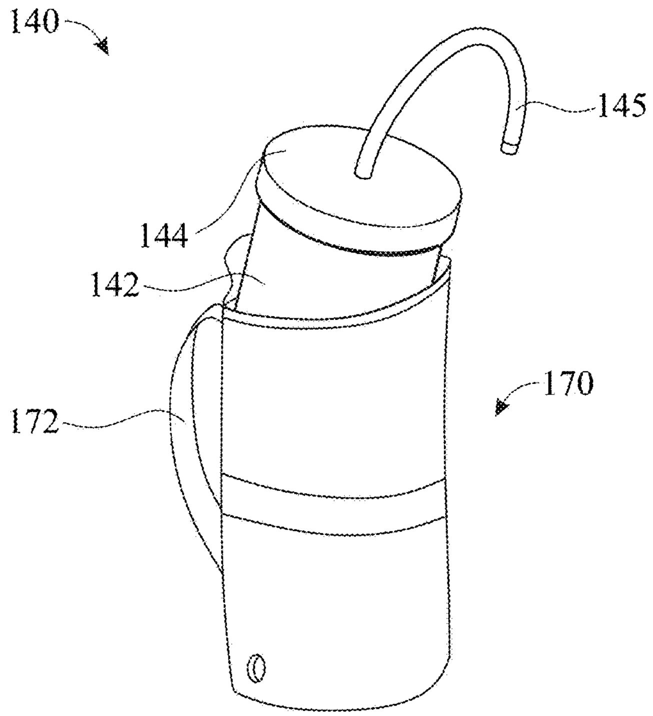
FIGS. 5A and 5B illustrate a bag for accommodating the paint bucket to be carried by a painter, in accordance with one embodiment of the present specification.
Figure 5B:
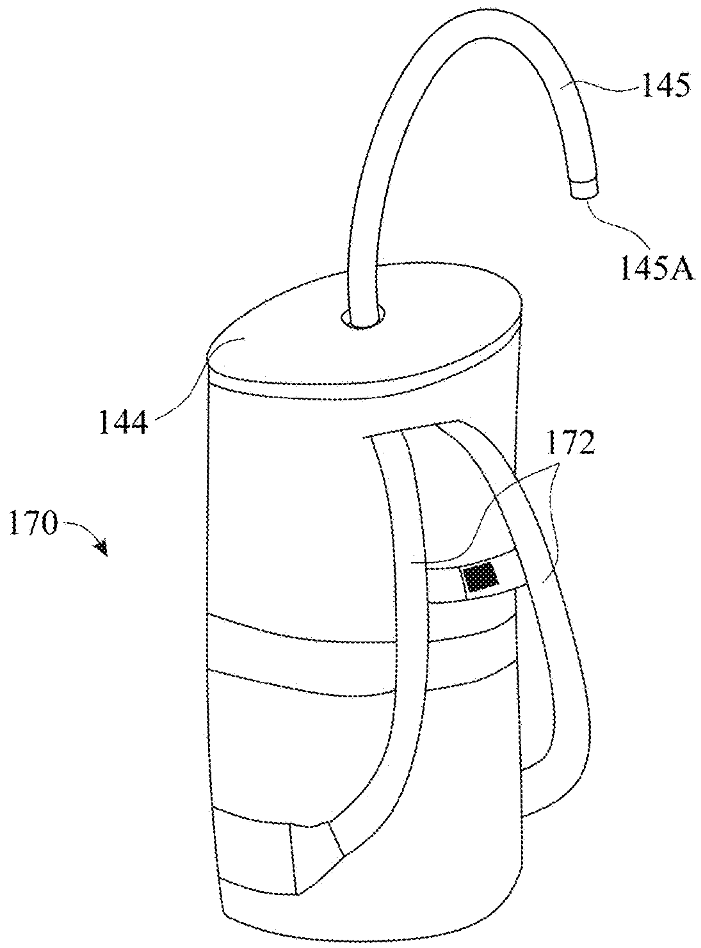

In an embodiment, the paint bucket 140 may be carried by a painter during paint application. The paint bucket 140 may be carried in a bag worn by the painter. FIGS. 5A and 5B illustrates a bag 170 for accommodating the paint bucket 140 to be carried by the painter. As seen in FIG. 5A, the paint bucket 140 can be inserted into the bag 170. FIG. 5B depicts the paint bucket 140 fully accommodated within the bag 170. The bag 170 may include a pair of shoulder straps 172 configured to allow the bag 170 to be worn by a painter. The bag 170 may further include a Velcro strip configured to adjust the pair of shoulder straps 172 so that the painter comfortably carries the bag 170 containing the paint bucket 140.

Figure 6:
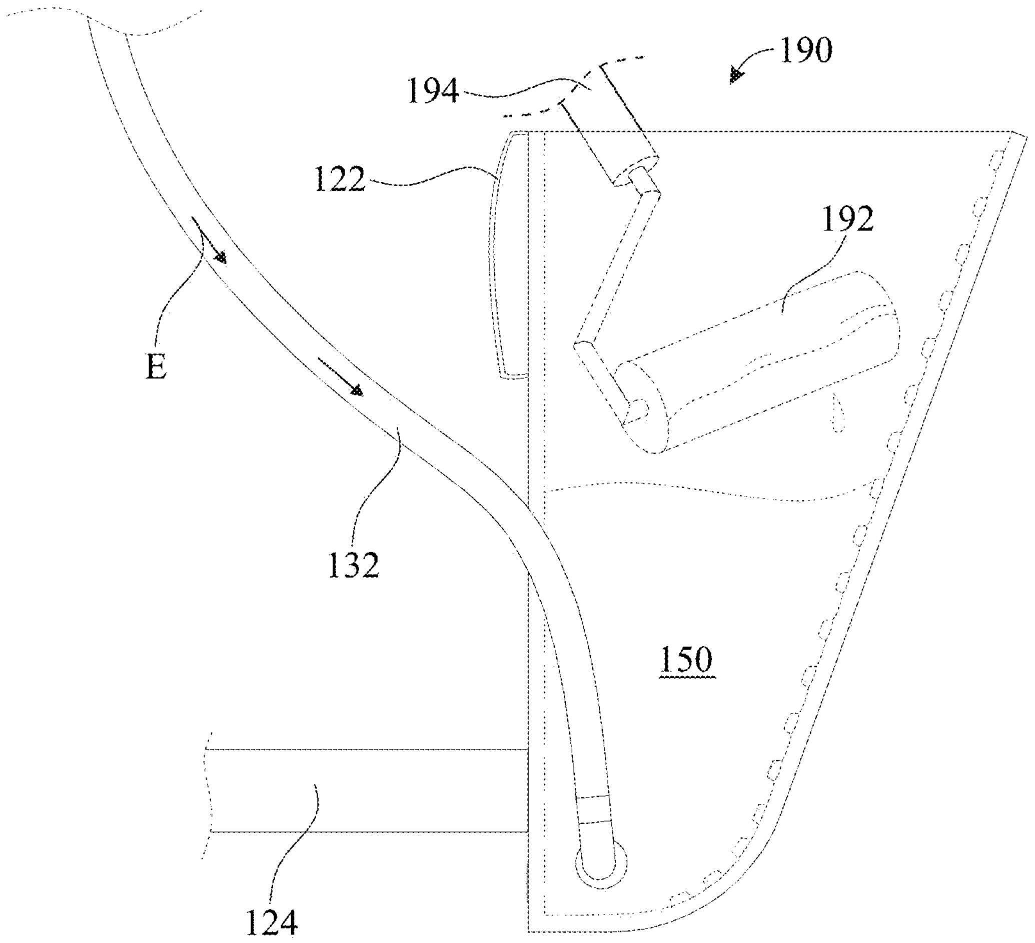
FIG. 6 illustrates the paint device being used in conjunction with a paint roller, in accordance with one embodiment of the present specification.
Figure 7:
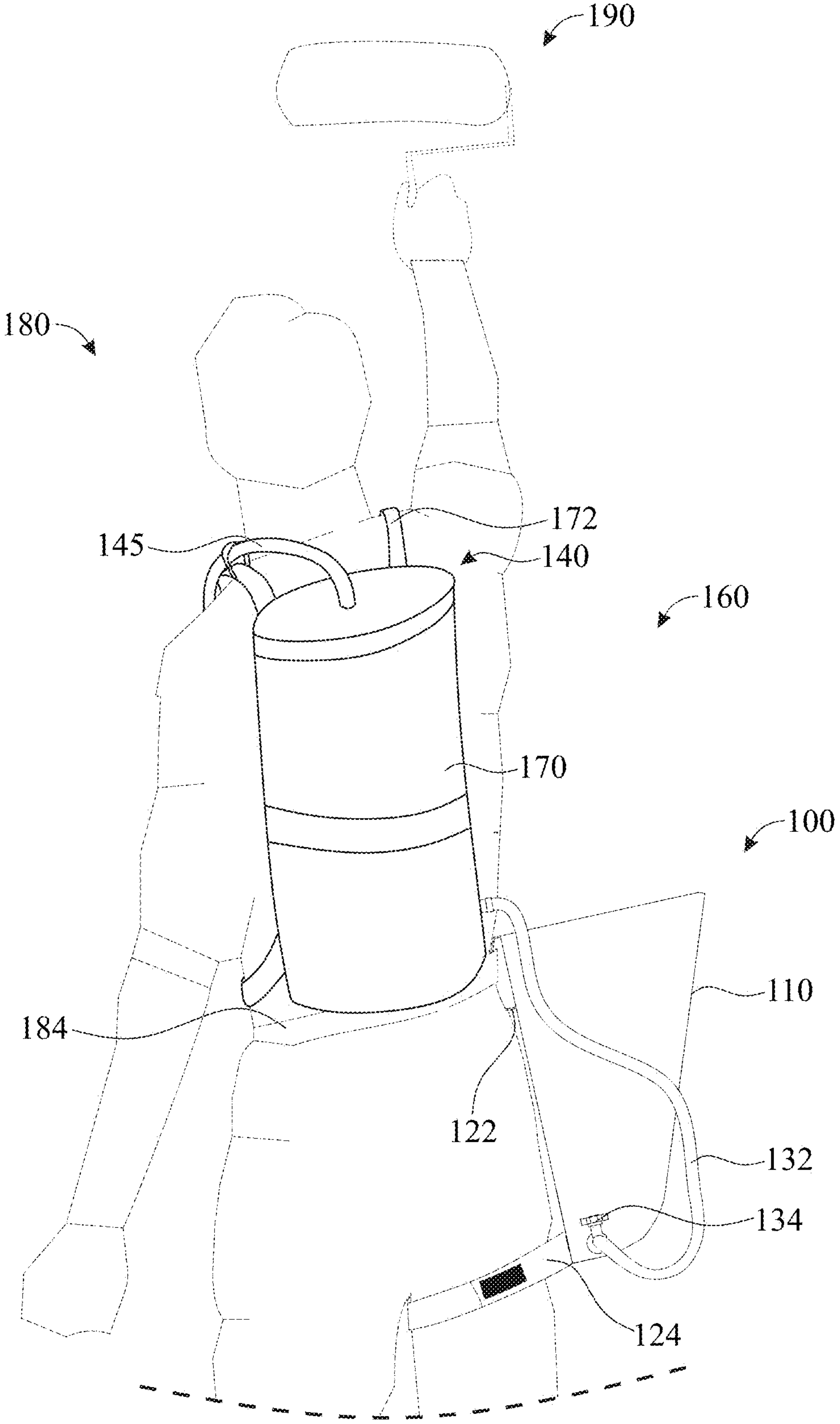
FIG. 7 illustrates the painter carrying the system for paint application, in accordance with one embodiment of the present specification.

Reference is now made to FIGS. 6-7 that illustrates the refillable and portable system 160 in operation by a painter 180. FIG. 6 illustrates the device 100 being used in conjunction with a paint roller 190. FIG. 7 depicts the painter 180 carrying the system 160 for paint application.

As seen in FIG. 7, the painter 180 carries the device 100 by passing a waist belt 184 through the bracket 122 of the device 100. Further, the strap 124 is tied around the thigh of the painter 180. In an embodiment, the strap 124 may include a Velcro strip to secure the strap around the thigh of the painter 180. Accordingly, the device 100 is carried securely by the painter 180.

Further, the painter 180 also carries the paint bucket 140. The paint bucket 140 may be accommodated within the bag 170 worn over the shoulder by the painter 180 by means of the shoulder straps 172. When the paint bucket 140 is accommodated within the bag 170, the air inlet pipe 145 may extend out of the bag 170 so as to allow flow of air into the air inlet pipe 145. In an embodiment, the shoulder straps 172 may be provided with a holding loop to hold the air inlet pipe 145 in place adjacent to the shoulder straps 172.

In operation, the air enters the container portion 142 via the air inlet pipe 145. The container portion 142 has paint 150 stored therein. The paint 150 stored in the container portion 142 then flows into the outlet pipe 146 (via the opening in the funnel-shaped bottom wall 142*a* of the container portion 142, as described above). As seen in FIG. 6, the paint 150 flows out of the outlet pipe 146 and through the paint hose 132 into the device 100. Arrow E depicts the flow of paint through the paint hose 132. The knob 134 may be opened by the painter 180 to allow flow of paint into the space S2 of the device 100. The paint 150 is thus provided in the space S2 of the device 100.

The painter 180 may use a paint roller 190 for the paint application. The paint roller 190 may be manually held by the painter 180. The paint roller 190 has a roller cover 192 that absorbs and applies paint to a surface. The roller cover 192 may be formed of a suitable material, such as, synthetic fibers (polyester, nylon, etc.), natural fibers (woo, mohair, etc.), foam, microfiber, and the like. The roller 190 may further comprise a frame 194 or handle to which the roller cover 192 is attached.

The painter 180 may roll the paint roller 190 on the ramp wall 110. This causes the roller cover 192 to come in contact with the plurality of teeth 112 on the ramp wall 110 as well as the ramp wall 110. When the roller cover 192 rolls over the plurality of teeth 112, the plurality of teeth 112 causes the fibers of the roller cover 192 to open up. This creates an additional surface area of the paint 150 to adhere to, thereby increasing the paint-holding capacity of the paint roller 190. The roller performance is thus optimized. The painter 180 can thus efficiently carry out the paint application. When paint is the device 100 is close to finishing, the painter 180 may transfer more paint into the device 100 from the paint bucket 140, in the manner as described above.

It is contemplated that the bag 170 as described herein may be suitably modified to be of any shape or form that may be worn by the painter 180 over the shoulders, and serve the purpose to accommodate the paint bucket 140. In a non-limiting embodiment, the bag 170 may be a knapsack, a kit bag, a rucksack, a shoulder bag, a tote bag, a bagpack, a satchel or the like. In a non-limiting example, the material of the bag 170 may comprise a netting material.

The present disclosure thus provides a portable and refillable system having a paint device and a paint bucket. The portable system can be carried by the painter for paint application jobs. The portable system can be carried to tight places, such as chimneys, with all the material required for the paint application. The painter has the paint stored in the paint bucket and travel time to refill paint is eliminated. Further, with the paint device, proper paint absorption before application is achieved by enhancing paint absorption and retention capabilities of paint rollers.

Since the portable and refillable paint system can be carried by the painter hands-free (without a hand-held bucket), the painter may use their hands to climb ladders, safety ropes or the like to access places where the painting is to be performed. For instance, the painter can conveniently position himself in difficult locations such as chimneys, scuffles, ladders, roof jocks, etc. The portable and refillable paint system as described herein enable mobility of the painters in a safe manner without worrying about carrying paint and other associated materials in their hands, thereby allowing the painter to keep their hands free for safety as well as for painting applications.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A paint device configured to be coupled to a portable paint bucket, the paint device comprising:

a back wall;

a ramp wall comprising a plurality of teeth staggered thereon, the plurality of teeth being configured to cause an increase in surface area of a roller cover of a paint roller when the paint roller rolls over the plurality of teeth;

side walls interconnecting the back wall and the ramp wall;

a space defined by the ramp wall, the back wall, and the side walls for accommodating paint therein; and a paint hose coupled to one of the side walls, the paint hose being configured to enable flow of the paint from the paint bucket into the space of the paint device.

2. The paint device of claim 1, further comprising a bracket coupled to the back wall and defining an area therebetween, the bracket configured to receive a belt into the defined area, thereby enabling the paint device to be worn by a painter.

3. The paint device of claim 1, further comprising a strap coupled to the back wall, the strap being configured to be wrapped around a limb of a painter, thereby enabling the paint device to be secured to the painter.

4. The paint device of claim 1, wherein the paint hose comprises a knob configured to control the flow of paint into the space of the paint device, and wherein the knob is rotatable to control the flow of paint into the space of the paint device.

5. The paint device of claim 1, wherein the paint hose is coupled to an outlet pipe of the paint bucket, thereby fluidly coupling the paint device to the paint bucket.

6. The paint device of claim 1, wherein the ramp wall is angled with respect to back wall.

7. A paint bucket configured to be fluid coupled to a paint device, the paint bucket comprising:

a cap portion;

a container portion configured to be threadably engaged with the cap portion, the container portion comprising a funnel-shaped bottom wall, wherein the container portion is configured to store paint therein; and an outlet pipe fluidly coupled to the container portion via an opening in the funnel-shaped bottom wall, the outlet pipe being configured to allow flow of the paint from the container portion to the paint device, thereby fluidly coupling the paint bucket to the paint device, wherein the paint bucket is portable, and wherein the cap portion comprises an air inlet pipe configured to allow flow of air into the container portion when the cap portion is engaged with the container portion.

8. The paint bucket of claim 7, further comprising a pipe hole in the container portion, the pipe hole being configured to fluidly couple the outlet pipe to a paint hose of the paint device, wherein the outlet pipe extends between the pipe hole and the funnel-shaped bottom wall.

9. The paint bucket of claim 7, wherein the air inlet pipe comprises a check valve configured to allow the flow of air into the container portion and prevent the flow of paint therethrough.

10. The paint bucket of claim 7, wherein the paint bucket is configured to be accommodated within a bag, and wherein the bag comprises shoulder straps configured to allow the bag to be carried by a painter.

11. A portable and refillable paint system, comprising:

a paint device comprising:

a ramp wall having a plurality of teeth staggered thereon;

a space defined by the ramp wall, a back wall, and side walls for accommodating paint therein; and a paint hose configured to enable flow of the paint into the space of the paint device; and a paint bucket fluidly coupled to the paint device, the paint bucket comprising:

a container portion configured to store paint therein, the container portion comprising a funnel-shaped bottom wall;

an air inlet pipe configured to allow flow of air into the container portion; and an outlet pipe fluidly coupled to the container portion via an opening in the funnel-shaped bottom wall, the outlet pipe being configured to allow flow of the paint from the container portion to the paint device via the paint hose, thereby fluidly coupling the paint bucket to the paint device.

12. The system of claim 11, wherein the paint bucket further comprises a pipe hole in the container portion, the pipe hole being configured to fluidly couple the outlet pipe with the paint hose of the paint device, and wherein the outlet pipe extends between the pipe hole and the funnel-shaped bottom wall.

13. The system of claim 11, wherein the paint bucket further comprises a cap portion integrated with the air inlet pipe, the air inlet pipe comprising a check valve configured to allow the flow of air into the container portion and prevent the flow of paint therethrough.

14. The system of claim 11, wherein the paint bucket is configured to be accommodated within a bag, and wherein the bag comprises shoulder straps configured to allow the bag to be carried by a painter.

15. The system of claim 11, wherein the paint device further comprises a bracket coupled to the back wall and defining an area therebetween, the bracket configured to receive a belt into the defined area, thereby enabling the paint device to be worn by a painter.

16. The system of claim 11, wherein the paint device further comprises a strap coupled to the back wall, the strap being configured to be wrapped around a limb of a painter, thereby enabling the paint device to be secured to the painter.

17. The system of claim 11, wherein the paint hose comprises a knob configured to control the flow of paint from the container portion of the paint bucket into the space of the paint device, and wherein the knob is rotatable to control the flow of paint into the space of the paint device.

18. The system of claim 11, wherein the paint hose is transparent, thereby enabling a painter to monitor the flow of paint in the paint hose.

19. The system of claim 11, wherein each teeth of the plurality of teeth is funnel shaped, and wherein the plurality of teeth are configured to cause an increase in surface area of a roller cover of a paint roller when the paint roller rolls over the plurality of teeth.

* * * * *